May 31, 1966 R. R. GUNDERSON 3,253,570
FOLDABLE HIGHWAY WARNING SIGNAL
Filed Oct. 5, 1964 2 Sheets-Sheet 2
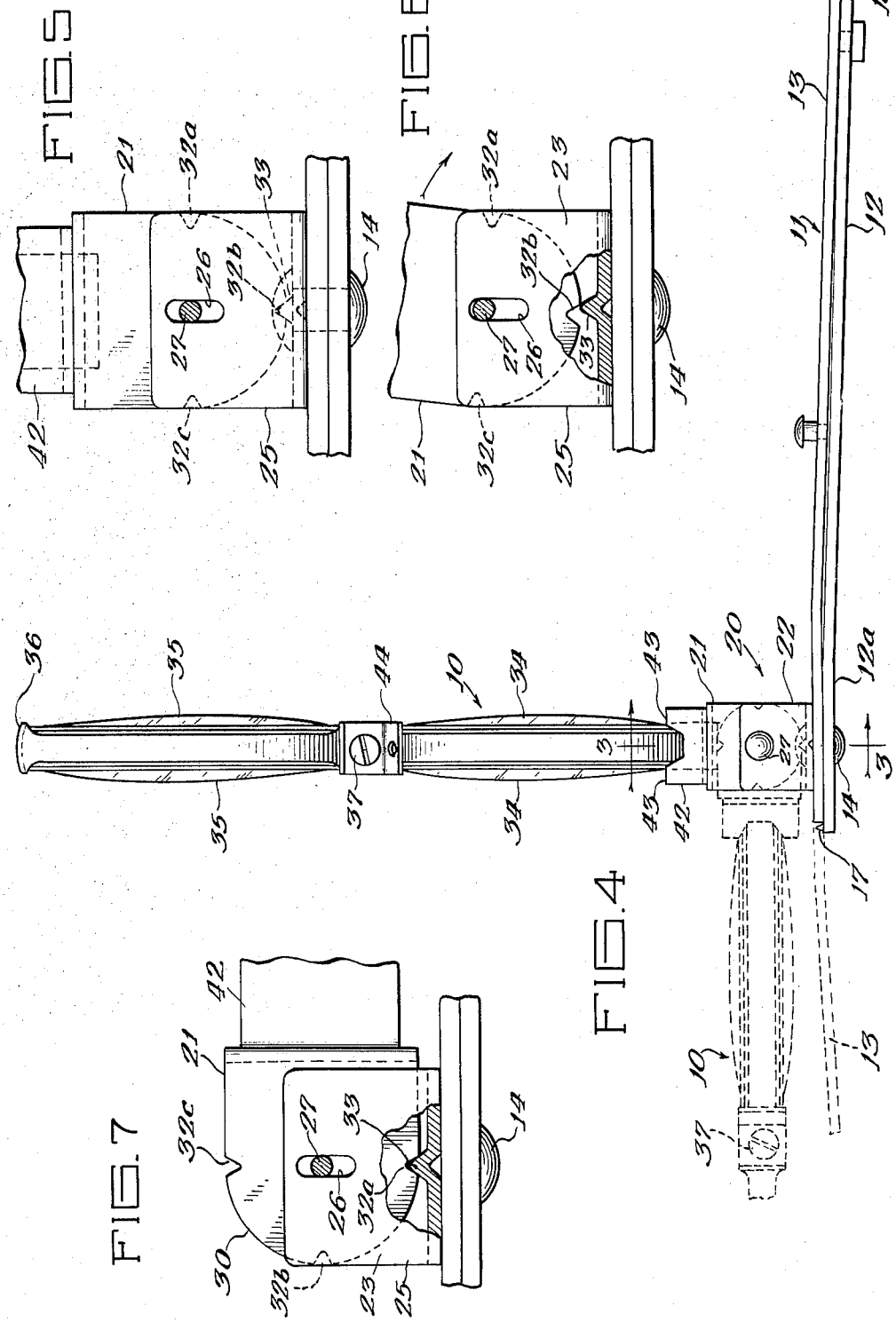

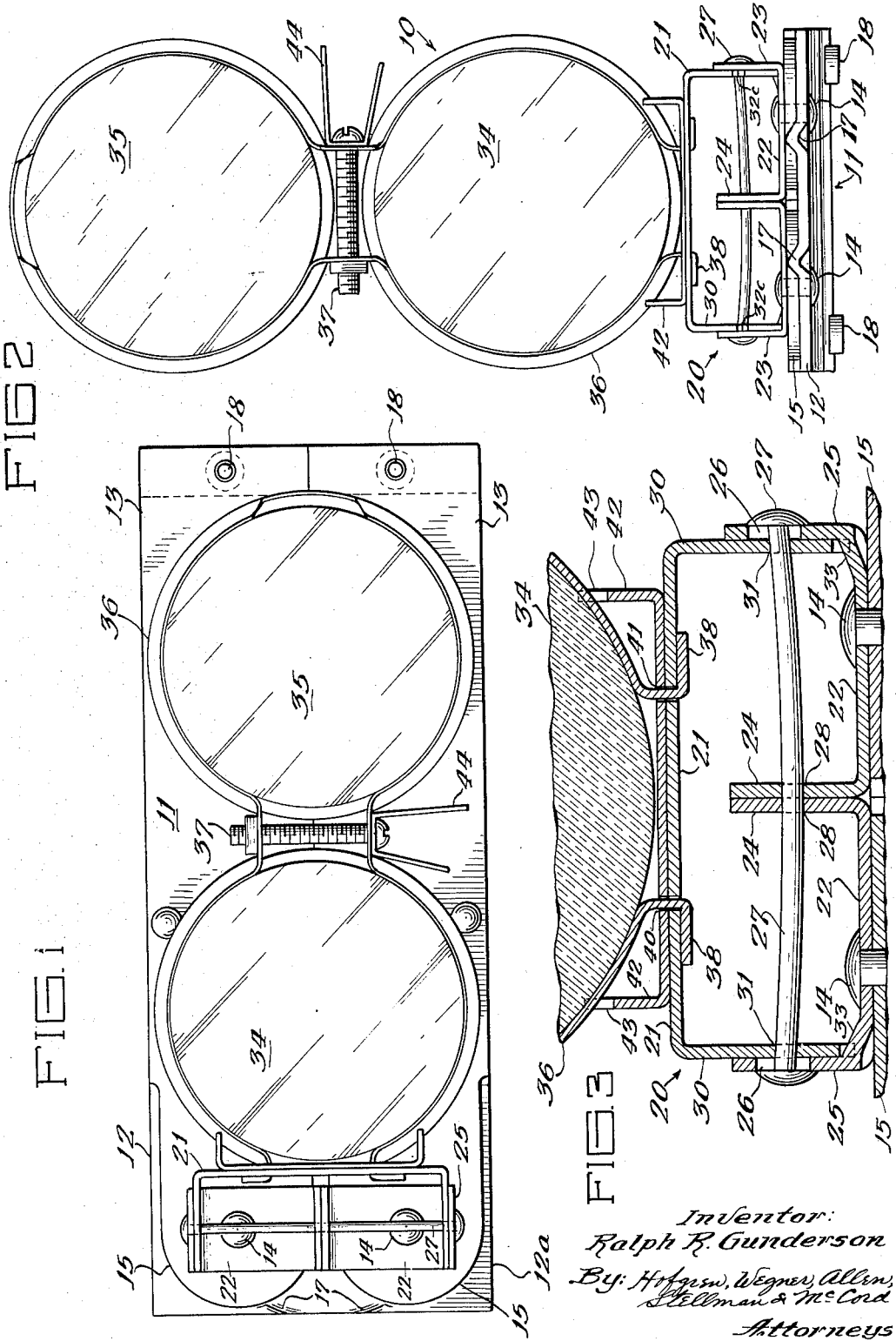

United States Patent Office 3,253,570
Patented May 31, 1966

3,253,570
FOLDABLE HIGHWAY WARNING SIGNAL
Ralph R. Gunderson, c/o Vari-Products Co.,
330 N. Harding Ave., Chicago, Ill. 60624
Filed Oct. 5, 1964, Ser. No. 401,513
5 Claims. (Cl. 116—63)

This invention relates to a foldable warning signal of the type commonly used to warn approaching highway traffic of the existence of an obstruction or other dangerous condition, and more particularly, to an improved latching structure for maintaining such a warning signal in signaling position.

Warning signals of this type are generally carried in reclining or retracted position in a convenient storage location on a highway vehicle. When the vehicle is stalled or stopped for any reason on the shoulder of a highway, warning signals are commonly set out fore and aft of the vehicle. It is thus desirable that the warning signal be capable of being moved to an operative signaling position quickly and easily, and that it be sturdy and stable when placed in operative position so that it can resist forces tending to move it or tip it over. It is also desirable that the warning signal be capable of being folded compactly in storage position so as to occupy a minimum of space in the vehicle, and that it be capable of being manufactured sufficiently inexpensively so as to compete successfully commercially with combustion type flares. The structure of the present warning signal is particularly well adapted to meet the above requirements and in addition affords a novel latching structure which enables the signaling device to be releasably retained in any one of a plurality of positions.

The primary object of the present invention is to provide a new and improved foldable warning signal.

Another object is to provide a new and improved latching structure for such a foldable warning signal in which a hinge pin swingably mounts the signaling device, and in addition the hinge pin is constructed and arranged to resiliently urge latching portions of the warning signal into latching engagement in any one of a plurality of latching positions.

A further object is to provide a new and improved hinge structure affording laterally spaced latch portions to enhance stability of the warning signal when in operative position.

Another object is to provide a new and improved hinge structure having two pairs of mutually supporting arm members, each pair being laterally spaced to enhance stability of the warning signal and being constructed and arranged to accommodate movement of the end portions of the resilient hinge pin during latching and unlatching of the signaling device.

The invention is illustrated in the preferred embodiment in the accompanying drawings, in which:

FIGURE 1 is a top plan view of a warning signal with the signal device and supporting legs in retracted closed position;

FIGURE 2 is a front elevational view of the warning signal of FIGURE 1, showing the signaling device latched in upright signaling position and the supporting legs in retracted closed position;

FIGURE 3 is an enlarged fragmentary sectional view taken as indicated on line 3—3 of FIGURE 4;

FIGURE 4 is a side elevational view of the warning signal showing the signaling device latched in upright operative position and the leg members in retracted closed position, the fragmentary view of the signaling device in dotted outline illustrating the position of the signaling device when latched in forward extended position;

FIGURE 5 is an enlarged fragmentary side elevational view, partly in section, illustrating the position of the latching portions and of the resilient hinge pin when the signaling device is in upright signaling position;

FIGURE 6 is an enlarged fragmentary broken side elevational view, partly in section, similar to the view of FIGURE 5, and showing the latch portions being disengaged and indicating the position of the resilient hinge pin during unlatching as the signaling device is swung toward reclining position; and FIGURE 7 is a view similar to FIGURE 6, illustrating the position of the latch portions and the resilient hinge pin when the signaling device is in reclining closed position.

In the embodiment illustrated, a warning signal frame or signaling device, generally designated 10, is swingably mounted on a supporting base or base assembly, generally designated 11, for movement between a closed reclining or retracted position (FIGURE 1) and a latched upright signaling position (FIGURE 2) or a latched forward extended position, shown in dotted outline in FIGURE 4.

As best seen in FIGURE 1, the supporting base 11 preferably includes an elongated base plate or first supporting leg 12 and a pair of secondary supporting legs 13, each pivotally secured to the front end portion 12a of base plate 12 by rivets or pivot pins 14. The pivoted end of each of the secondary supporting legs 13 is preferably formed arcuately on a radius, as at 15, to provide clearance for the legs 13 as they are swung outwardly and forwardly from retracted closed position (FIGURE 1) to an open spread supporting position (FIGURE 4).

The front end portion 12a of the first supporting leg 12 may be inclined slightly at an acute angle to the plane of the leg 12 and each of the secondary legs 13 is similarly bent through approximately the same angle so that they lie closely adjacent the upper surface of the leg 12 when in retracted position. The acute angle formed in each of the supporting legs spaces the central portion of the device from a supporting surface thereby to enhance the stability of the signaling device 10 when supported on an uneven surface.

A pair of stop members 17 is preferably struck upwardly from the front end portion 12a of the supporting leg 12 in such a position as to limit or stop the movement of each of the supporting legs 13 in the optimum supporting position forwardly of the first supporting leg 12. As best seen in FIGURES 1, 2 and 4, the supporting ends of each of the supporting legs may be perforated to receive a rubber element 18, each of which is intended to rest on the supporting surface when the legs are in open operative position. Preferably, the secondary supporting legs 13 are of such length as to overlap the first supporting leg 12 when in closed retracted position, as seen in FIGURES 1 and 4, so that the rubber elements 18 will not interfere with the compactness of the supporting base assembly 11 when folded into closed retracted position.

As best seen in FIGURES 3 and 4, the signaling device 10 is preferably swingably mounted upon the forward end portion 12a of the base assembly 11 by a hinge structure, generally designated 20. The hinge structure 20 includes an upper hinge portion 21 and a lower hinge portion 22. The lower hinge portion 22 is preferably formed from a pair of U-shaped members 23 positioned side-by-side and secured to the base assembly 11 by the pivot pins 14. Each member 23 has an inner arm 24 and an outer arm 25, each outer arm being provided with an elongated slot 26 to afford an appropriate lost motion connection between the upper hinge portion 21 and an elongated hinge pin 27 which swingably joins the upper and lower hinge portions. As best seen in FIGURE 3, the inner arms 24 are each similarly apertured at 28 and afford an intermediate central bearing for the hinge pin 27.

The upper hinge portion 21 is provided with depending arms 30, each of which is apertured at 31 to afford outer bearings for the hinge pin 27. From FIGURE 3, it will be noted that the apertures at 28 and the lower hinge portion 22 are located slightly closer to the base assembly 11 than the apertures at 31 in the depending arms 30 of the upper hinge portion 21 so that the resilient hinge pin 27 is slightly resiliently deformed into an arcuate shape. Thus, the opposite ends of the resilient hinge pin 27 are normally resiliently urging the depending arms 30 of the upper hinge portion 21 toward the lower hinge portion 22 and relative movement is provided between the two hinge portions 21 and 22 by the elongated slot 26 in which the opposite ends of the hinge pin 27 can move.

As best seen in FIGURE 3 and FIGURES 5–7, latch means are provided for releasably holding the swingable upper hinge portion 21 in any one of a number of latching positions. To this end, the lower or terminal ends of the depending arms 30 are preferably each similarly rounded on a radius and are each provided with a number of recesses located approximately 90° apart on the rounded terminal end to afford a plurality of transversely extending latching notches 32a, 32b, 32c. A pair of latching detents 33 are struck upwardly adjacent the lower end of each of the outer arms 25 of the U-shaped members 23, as shown in FIGURES 3 and 7, and each of these latching detents 33 is positioned and arranged to snugly fit within a corresponding pair of the latching notches 32a, 32b and 32c when the upper hinge portion 21 is appropriately swung to engage these detents.

The signaling device is conventional in character and includes a lower pair of lenses 34 and an upper pair of lenses 35, each arranged with its reflecting surfaces facing outwardly. The two pairs of lenses are held in spaced relation by a bezel 36 forming the frame of the signaling device 35. The bezel 36 clamps or embraces a major portion of the peripheral marginal edge portions of each of the pairs of reflecting lenses and is provided in its central portion with a nut and bolt 37 which passes through perforate portions of the bezel 36 so that the bezel is snugly retained about the pairs of lenses. As best seen in FIGURE 3, the lower free ends 38 of the bezel 36 preferably are passed through aligned slots 40, 41 in the medial portion of a cradle 42 and of the upper hinge portion 21. The free ends 38 of the bezel 36 are then bent or crimped outwardly beneath the medial part of the upper hinge portion 21 to securely anchor the lens structure. The cradle 42 is provided to further enhance the stability of the signaling device 10 by affording a pair of bifurcated arms 43 into which the bezel 36 and lens structure may nest, as shown in FIGURES 3 and 4.

If desired, a U-shaped perforate bracket 44 may be provided to accommodate the staff of a warning flag.

In the present invention, the latching means is constructed and arranged to provide positive latching of the signaling device 10 in its closed or reclining position (FIGURE 1), in its upright signaling position (FIGURE 2), and in its forward extended position, shown in dotted outline in FIGURE 4. When in forward extended position, that is, when the signaling device 10 is swung through 180° from reclining position, the supporting legs may be retained in closed position and the supporting base assembly 11 may be impaled in mud, snow or the like to support the signaling device in an operative signaling position.

The operation of the latching structure is best shown in FIGURES 3 through 7. In FIGURE 5, the signaling device 10 is shown in upright signaling position with the latching notches 32b resiliently held against the latching detents 33 by the resilience or spring action of the end portions of the elongated hinge pin 27.

In FIGURE 6, the signaling device 10 is shown being swung toward retracted or reclined position and the unlatching occurs by virtue of the elongated resilient hinge pin and the lost motion connections afforded at opposite ends of the hinge pin. In other words, the opposite ends of the hinge pin 27 are yieldingly forced upwardly in the slot as the terminal ends of the depending arms 30 ride upwardly over the latching detents 33 (FIGURE 6). The latching detent then rides along the periphery of the terminal ends of the depending arms 30 and, after a 90° traverse to reclining position, once again the latching notches 32a snap downwardly to embrace the latching detents 33 and hold the signaling device 10 in latched retracted position.

Similarly, the signaling device 10 may be swung from retracted closed position forwardly 180°, as shown in FIGURE 4, so that the latching notches 32c are resiliently held about the latching detents 33 and the signaling device 10 is releasably latched in forward extended position.

The foregoing detailed description is given for clearness of understanding only, and no unnecessary limitations should be understood therefrom for some modifications will be obvious to those skilled in the art.

I claim:

1. A foldable warning signal, comprising: a supporting base having a lower hinge portion thereon; a signaling device having an upper hinge portion thereon; a pair of cooperating latch portions operable between the base and the signaling device for releasably latching said signaling device in signaling position; and an elongated resilient hinge pin positioned and arranged to rotatably join the upper and lower hinge portions to swingably mount the signaling device on the base for movement from reclining position over said base to said signaling position and to be resiliently deformable in response to latching and unlatching of the latch portions so as to exert forces normally urging said latch portions toward latching engagement.

2. A foldable warning signal as specified in claim 1, in which the hinge portions provide laterally spaced bearings for the opposite end portions of the hinge pin, one of the bearings affording a lost motion connection so that one end portion of the hinge pin can yieldingly move in said lost motion connection during latching and unlatching of the latch portions to exert the forces normally urging the latch portions toward latching engagement.

3. A foldable warning signal as specified in claim 1, in which a second pair of latch portions is spaced laterally of the first pair of latch portions for cooperation therewith to releasably latch said signaling device in signaling position, the hinge portions being provided with a pair of laterally spaced bearings for the opposite end portions of the hinge pin and an intermediate bearing for the central portion of the hinge pin, the laterally spaced bearings each affording a lost motion connection so that the opposite end portions of the hinge pin will each yieldingly move in the laterally spaced bearings during latching and unlatching of the latch portions to exert the forces resiliently urging the two spaced pairs of latch portions toward latching engagement.

4. A foldable warning signal as specified in claim 3, in which the intermediate bearing is positioned so as to be out of alignment with the laterally spaced bearings whereby the opposite end portions of the hinge pin are resiliently arcuately deformed to yieldingly exert forces urging the two pairs of latch portions toward latching engagement.

5. A foldable warning signal as specified in claim 3, in which the first and second pairs of latch portions are positioned on the hinge portions and adjacent the laterally spaced bearings.

References Cited by the Examiner

UNITED STATES PATENTS

| | | | |
|---|---|---|---|
| 2,307,087 | 1/1943 | White | 220—35 |
| 3,077,326 | 2/1963 | Magazanik et al. | 88—79 |
| 3,077,853 | 2/1963 | Gunderson | 88—79 |
| 3,123,041 | 3/1964 | Gunderson | 88—79 |

LOUIS J. CAPOZI, *Primary Examiner.*